(12) United States Patent
Hammad

(10) Patent No.: US 11,030,593 B2
(45) Date of Patent: *Jun. 8, 2021

(54) PROCESSING AUTHORIZATION REQUEST USING SEASONED DATA

(71) Applicant: Visa International Service Association, San Francisco, CA (US)

(72) Inventor: Ayman Hammad, Pleasanton, CA (US)

(73) Assignee: Visa International Service Association, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/870,788

(22) Filed: May 8, 2020

(65) Prior Publication Data

US 2020/0286055 A1 Sep. 10, 2020

Related U.S. Application Data

(63) Continuation of application No. 16/532,167, filed on Aug. 5, 2019, now Pat. No. 10,685,338, which is a
(Continued)

(51) Int. Cl.
*G06Q 20/12* (2012.01)
*G06Q 20/40* (2012.01)
(Continued)

(52) U.S. Cl.
CPC .......... *G06Q 20/12* (2013.01); *G06Q 20/32* (2013.01); *G06Q 20/40* (2013.01);
(Continued)

(58) Field of Classification Search
None
See application file for complete search history.

(56) References Cited

U.S. PATENT DOCUMENTS 5,819,226 A 10/1998 Gopinathan et al.
5,819,291 A * 10/1998 Haimowitz ......... G06F 16/9014
(Continued)

FOREIGN PATENT DOCUMENTS

AU 2010276361 11/2014
EP 2457200 5/2012
(Continued)

OTHER PUBLICATIONS

M. Song, J. Li and X. Wu, "A Mutual Authentication Model between Merchant and Consumer in M-Commerce," Second International Conference on Innovative Computing, Informatio and Control (ICICIC 2007), Kumamoto, 2007, pp. 489-489. (Mutual Authentication). (Year: 2007).*
(Continued)

*Primary Examiner* — Chikaodinaka Ojiaku
(74) *Attorney, Agent, or Firm* — Kilpatrick Townsend & Stockton LLP

(57) ABSTRACT

A system, apparatus, and method for expediting the authorization of an electronic payment transaction. Authorization of a transaction at a node of an authorization network is the result of inferring the trustworthiness of a customer to the transaction using data obtained from a different node of the authorization network. The authorization process is expedited by relying on the previous authentication decision of another node, where the previous decision may have been made based on a different payment device or different user inputs. The invention uses a decision made by a first node in the authorization network as a proxy for the authorization decision at a different node, thereby transferring the trustworthiness of a consumer, consumer's device, payment device, or other aspect of the transaction from the first node to the second.

20 Claims, 5 Drawing Sheets

Related U.S. Application Data continuation of application No. 12/507,745, filed on Jul. 22, 2009, now Pat. No. 10,438,181.

(51) Int. Cl.
  *G06Q 20/32* (2012.01)
  *G06Q 30/06* (2012.01)
  *G07F 7/08* (2006.01)

(52) U.S. Cl.
  CPC ..... *G06Q 20/4016* (2013.01); *G06Q 20/4018* (2013.01); *G06Q 30/06* (2013.01); *G07F 7/08* (2013.01)

(56) References Cited

U.S. PATENT DOCUMENTS

| | | | |
|---|---|---|---|
| 5,903,882 A | 5/1999 | Asay et al. | |
| 5,913,025 A * | 6/1999 | Higley | G06F 21/31 707/999.009 |
| 5,960,430 A * | 9/1999 | Haimowitz | G06F 16/9014 |
| 6,108,642 A | 8/2000 | Findley | |
| 6,330,327 B1 * | 12/2001 | Lee | H04M 3/5183 379/142.06 |
| 6,330,546 B1 | 12/2001 | Gopinathan et al. | |
| 6,601,048 B1 | 7/2003 | Gavan et al. | |
| 6,714,919 B1 | 3/2004 | Findley | |
| 6,798,780 B1 * | 9/2004 | Dan | H04L 12/2854 370/216 |
| 6,856,963 B1 * | 2/2005 | Hurwitz | G06Q 30/0201 705/7.29 |
| 7,158,947 B1 | 1/2007 | Findley et al. | |
| 7,188,003 B2 | 3/2007 | Ransom | H04L 63/20 700/286 |
| 7,200,578 B2 * | 4/2007 | Paltenghe | G06F 21/6209 705/1.1 |
| 7,251,624 B1 | 7/2007 | Lee et al. | |
| 7,376,431 B2 * | 5/2008 | Niedermeyer | G06Q 20/403 455/456.3 |
| 7,433,855 B2 | 10/2008 | Gavan et al. | |
| 7,441,239 B2 | 10/2008 | Bittner et al. | |
| 7,509,289 B2 * | 3/2009 | Barron | G06Q 20/10 705/38 |
| 7,610,040 B2 | 10/2009 | Cantini et al. | |
| 7,637,422 B2 * | 12/2009 | Kwak | G07F 19/202 235/379 |
| 7,640,193 B2 * | 12/2009 | Crespo | G06Q 30/06 705/26.2 |
| 7,657,460 B2 | 2/2010 | Findley | |
| 7,668,769 B2 | 2/2010 | Baker et al. | |
| 7,793,829 B2 * | 9/2010 | Randazza | G06Q 20/4014 235/379 |
| 7,831,246 B1 * | 11/2010 | Smith | H04W 4/24 455/420 |
| 7,865,399 B2 * | 1/2011 | Crespo | G06Q 20/04 705/26.41 |
| 7,877,297 B2 * | 1/2011 | Gould | G06Q 30/0601 705/26.1 |
| 7,890,433 B2 * | 2/2011 | Singhal | G06Q 20/1085 705/64 |
| 7,912,751 B1 * | 3/2011 | Allos | G06Q 30/02 705/14.16 |
| 8,136,148 B1 * | 3/2012 | Chayanam | G06F 21/31 726/5 |
| 8,332,272 B2 * | 12/2012 | Fisher | G06Q 30/02 705/16 |
| 8,649,733 B2 * | 2/2014 | Qi | H04L 63/0869 455/41.2 |
| 10,438,181 B2 | 10/2019 | Hammad | |
| 2001/0021928 A1 | 9/2001 | Ludwig et al. | |
| 2002/0042885 A1 * | 4/2002 | Eskandarian | G06F 21/32 726/6 |
| 2002/0062249 A1 * | 5/2002 | Iannacci | G06Q 20/105 705/14.1 |
| 2002/0065695 A1 | 5/2002 | Francoeur et al. | |
| 2002/0138445 A1 * | 9/2002 | Laage | G06Q 20/3558 705/67 |
| 2003/0061170 A1 * | 3/2003 | Uzo | G06Q 20/367 705/64 |
| 2003/0097330 A1 * | 5/2003 | Hillmer | G06Q 20/206 705/38 |
| 2003/0172028 A1 | 9/2003 | Abell et al. | |
| 2003/0182421 A1 * | 9/2003 | Faybishenko | H04L 67/1044 709/224 |
| 2003/0200184 A1 * | 10/2003 | Dominguez | G06Q 20/3674 705/78 |
| 2003/0208684 A1 * | 11/2003 | Camacho | G06Q 20/401 713/186 |
| 2003/0212642 A1 * | 11/2003 | Weller | G06Q 20/4012 705/67 |
| 2004/0117302 A1 * | 6/2004 | Weichert | G06Q 20/108 705/40 |
| 2004/0143546 A1 * | 7/2004 | Wood | G06Q 20/102 705/40 |
| 2005/0108104 A1 * | 5/2005 | Woo | G06Q 20/12 705/26.41 |
| 2005/0149544 A1 * | 7/2005 | Bishop | G06Q 20/04 |
| 2005/0182774 A1 * | 8/2005 | Weir | G06Q 20/023 |
| 2005/0278192 A1 * | 12/2005 | Cantini | G06Q 40/025 705/39 |
| 2006/0036500 A1 * | 2/2006 | Ota | G06Q 20/327 705/16 |
| 2006/0135233 A1 * | 6/2006 | Willis | A63F 13/12 463/1 |
| 2006/0195362 A1 * | 8/2006 | Jacobi | G06Q 30/0277 705/343 |
| 2006/0242026 A1 * | 10/2006 | Crespo | G06Q 20/10 705/26.8 |
| 2007/0011104 A1 * | 1/2007 | Leger | G06Q 20/085 705/77 |
| 2007/0061259 A1 | 3/2007 | Zoldi et al. | |
| 2007/0164097 A1 * | 7/2007 | Kwak | G07F 19/20 235/379 |
| 2007/0181667 A1 * | 8/2007 | Kwak | G07F 19/201 235/379 |
| 2007/0192249 A1 | 8/2007 | Biffle et al. | |
| 2007/0271147 A1 | 11/2007 | Crespo et al. | |
| 2007/0282674 A1 | 12/2007 | Gomes et al. | |
| 2007/0288641 A1 | 12/2007 | Lee et al. | |
| 2008/0059962 A1 * | 3/2008 | Ito | H04N 1/4413 718/100 |
| 2008/0082452 A1 * | 4/2008 | Wankmueller | G06Q 20/40145 705/67 |
| 2008/0120218 A1 * | 5/2008 | Reid | G06Q 30/02 705/37 |
| 2008/0141366 A1 | 6/2008 | Cross et al. | |
| 2008/0164308 A1 * | 7/2008 | Aaron | G06Q 20/34 235/380 |
| 2008/0167980 A1 * | 7/2008 | Aaron | G06Q 20/14 705/35 |
| 2008/0177558 A1 | 7/2008 | Jung et al. | |
| 2008/0203153 A1 * | 8/2008 | Keithley | G06Q 20/24 235/380 |
| 2008/0208746 A1 | 8/2008 | Royyuru et al. | |
| 2008/0208759 A1 * | 8/2008 | Royyuru | G06Q 20/4012 705/72 |
| 2008/0243637 A1 * | 10/2008 | Chan | G06Q 30/0601 705/26.1 |
| 2009/0106134 A1 * | 4/2009 | Royyuru | G06Q 40/00 705/35 |
| 2009/0106154 A1 * | 4/2009 | Reynolds | G06Q 20/042 705/45 |
| 2009/0106826 A1 * | 4/2009 | Palestrant | H04L 9/3213 726/7 |
| 2009/0119190 A1 * | 5/2009 | Realini | G06Q 20/04 705/30 |
| 2009/0119205 A1 | 5/2009 | Keresman, III et al. | |
| 2009/0144194 A1 * | 6/2009 | Dickelman | G06Q 20/20 705/39 |
| 2009/0157538 A1 | 6/2009 | Subramaniam et al. | |

(56) References Cited

U.S. PATENT DOCUMENTS

| | | | | |
|---|---|---|---|---|
| 2009/0293108 | A1* | 11/2009 | Weeden | H04L 63/0815 726/6 |
| 2009/0313134 | A1* | 12/2009 | Faith | G06Q 30/0601 705/26.1 |
| 2010/0017328 | A1* | 1/2010 | Stephen | G06Q 20/40 705/43 |
| 2010/0280859 | A1* | 11/2010 | Frederick, II | G06Q 20/042 705/45 |
| 2010/0280882 | A1* | 11/2010 | Faith | G06Q 20/4016 705/7.37 |
| 2010/0318463 | A1* | 12/2010 | Reany | G06Q 20/04 705/44 |
| 2010/0332399 | A1* | 12/2010 | Benson | H04L 9/3247 705/71 |
| 2011/0022517 | A1 | 1/2011 | Hammad | |
| 2012/0151567 | A1 | 6/2012 | Chayanam et al. | |
| 2013/0282580 | A1* | 10/2013 | O'Brien | G06Q 20/065 705/44 |
| 2014/0012758 | A1 | 1/2014 | Keresman, III et al. | |
| 2014/0012759 | A1 | 1/2014 | Keresman, III et al. | |
| 2014/0012760 | A1* | 1/2014 | Keresman, III | G06Q 20/409 705/44 |
| 2014/0258125 | A1 | 9/2014 | Gerber et al. | |
| 2016/0063503 | A1 | 3/2016 | Kobres et al. | |

FOREIGN PATENT DOCUMENTS

| | | |
|---|---|---|
| KR | 20010086896 | 9/2001 |
| KR | 100390360 | 7/2003 |
| WO | 0227610 | 4/2002 |
| WO | 2005077066 | 8/2005 |
| WO | 2007041709 | 4/2007 |
| WO | 2011011401 | 1/2011 |

OTHER PUBLICATIONS

Google Search Results Listing (GoogleSResults).
CA2,767,542 , "Office Action", dated Nov. 15, 2013, 2 pages.
Metzger , "How Credit Card Transactions Work", Available online at: http://www.creditcards.com/credit-card-news/how-a-credit-card-is-processed-1275.php, Jan. 14, 2009, 5 pages.
Middlemiss , "No Signature Required", Available online at: http://www.bankrate.com/brm/news/cc/20060828a1can.asp, Aug. 28, 2006, 3 pages.
Ho Jeong Cheon, Ahead Mobile, Unexamined Korean Patent Publication No. 100390360 (10-200-0010866).
PCT/US2010/042586 , "International Search Report and Written Opinion", dated Jan. 28, 2011, 10 pages.
Song et al., "A Mutual Authentication Model between Merchant and Consumer in M-Commerce", Second International Conference on Innovative Computing, Informatio and Control (ICICIC), Sep. 5-7, 2007, 4 pages.
Song et al., "An Authentication Model Involving Trusted Third Party for M-Commerce", Sixth International Conference on the Management of Mobile Business, Jul. 9-11, 2007, 6 pages.

* cited by examiner

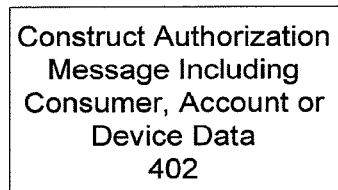
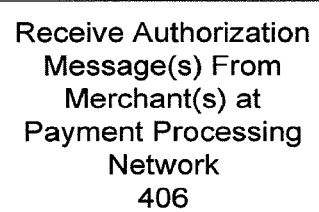
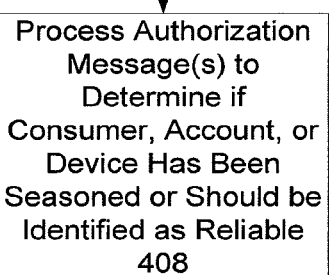
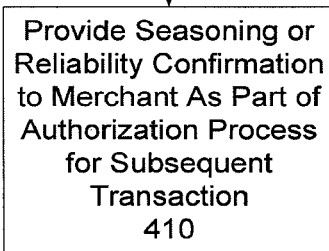
Figure 4a
Figure 4b
400
Figure 4

PROCESSING AUTHORIZATION REQUEST USING SEASONED DATA

CROSS-REFERENCES TO RELATED APPLICATIONS

This application is continuation application of U.S. patent application Ser. No. 16/532,167, filed Aug. 5, 2019, which is a continuation of U.S. patent application Ser. No. 12/507,745, filed Jul. 22, 2009, now U.S. Pat. No. 10,438,181, issued on Oct. 8, 2019 entitled "Authorizing A Payment Transaction Using Seasoned Data", which is herein incorporated by reference in its entirety for all purposes. The following patent applications are incorporated by reference in their entirety: U.S. patent application Ser. No. 12/507,750, now U.S. Pat. No. 9,396,465, entitled "Apparatus Including Data Bearing Medium for Reducing Fraud in Payment Transactions Using a Blacklist" and U.S. patent application Ser. No. 12/507,757, now abandoned, entitled "An Apparatus Including Data Bearing Medium for Seasoning a Device Using Data Obtained From Multiple Transaction Environments" each filed on Jul. 22, 2009.

BACKGROUND

Embodiments of the present invention are directed to systems, apparatuses and methods for enabling electronic payments and the processing of payment transaction data, and more specifically, to the authorization of a transaction based on the reputation of a node in the payment network or based on payment device, consumer data, or other information collected as part of a previous transaction. The inventive apparatus and associated systems and methods may be used to expedite the authorization of a transaction by associating the payment device, account or individual involved in a transaction with a previously authorized transaction, or with a merchant or other participant to the transaction that has previously determined that the payment device, account or individual is a reliable party to a transaction.

Consumer payment devices such as debit cards or credit cards are used by millions of people worldwide to facilitate various types of commercial transactions. In a typical transaction involving the purchase of a product or service at a merchant location, the payment device is presented at a point of sale terminal ("POS terminal") located at a merchant's place of business. The POS terminal may be a card reader or similar device that is capable of reading or accessing data stored on the payment device, where this data may include identification or authentication data, for example. Some or all of the data read from the payment device is provided to the merchant's transaction processing system and then to the Acquirer, which is typically a bank or other institution that manages the merchant's account. The data provided to the Acquirer may then be provided to a payment processing network which processes the data to determine if the transaction should be authorized by the payment processor, and assists in the clearance and account settlement aspects of the transaction. The authorization decision and clearance and settlement portions of the overall transaction may also involve communication and/or data transfer between the payment processing network and the bank or institution that issued the payment device (the Issuer). Transactions in which a consumer payment device is presented to a merchant or accessed by a point of sale terminal are termed "card present" transactions since the payment device is in the same physical location as the merchant or terminal.

A transaction involving the purchase of a product or service may also be initiated by a consumer by providing payment data from a remote location to a merchant over a network such as the Internet, typically using a computing device such as a personal computer or laptop computer (termed a "card not present" transaction). Transactions may also be initiated by using a mobile device such as a cell phone or PDA that communicates with a merchant or service provider directly or indirectly over a wireless network (which may be configured to enable data transfer between the wireless network and the Internet). Thus, payment information for a transaction may be provided using a payment device and point of sale terminal, remotely located computing device, or mobile device capable of wireless communications, among other methods.

Each element or participating node in the authorization process for a transaction may have its own information about the user. For example, a merchant may have records of the consumer's transaction history with that merchant, while the payment processor or Issuer may have access to identification data for the payment device being utilized, the consumer's account status, the consumer's overall transaction history, or consumer identification or security data. Further, each participant in the authorization process will typically have its own criteria for determining if authorization of the transaction is warranted at that stage in the overall authorization process.

Some of the data, such as the consumer data, payment device data, or point of sale terminal or consumer computing device data is typically not shared between the elements or nodes of the transaction authorization network. As a result, transactions initiated by the same consumer using different computing devices or by the same consumer with different merchants require the same authorization process, even though the consumer may have demonstrated that they are reliable when their entire payment and transaction history is considered. This delays acceptance of a consumer, consumer's account, or consumer's device as a reliable party to a transaction by the elements of the transaction authorization network, where more rapid acceptance would decrease the data processing and time required for transaction authorization. It may also prevent a merchant from accepting a transaction from a consumer that the merchant is familiar with and finds reliable, even though another node of the authorization network might decline to accept the transaction.

In an E-commerce environment in which a credit card or debit card is typically not presented to a merchant, authorization of a transaction initiated using a consumer device may be contingent on the device or the account being used for the transaction having a sufficient history of being used for successful transactions (i.e., not fraudulent or questionable transactions). In the absence of a sufficient transaction history, the consumer may be denied authorization for a transaction initiated using a new device (such as a new computer or mobile phone) or account, or issued a challenge message that they must respond to in order for the authentication process to continue. In addition to the data processing burden this places on the payment network, this can frustrate a consumer and have a negative impact on their use of the payment network for future transactions.

What is desired is a system, apparatus and method for expediting the authorization process for electronic payment transactions. Embodiments of the invention address these problems and other problems individually and collectively.

SUMMARY

Embodiments of the present invention are directed to a system, apparatus, and method for expediting the authorization of an electronic payment transaction. In some embodiments, the invention is directed to an apparatus that executes a method of authorizing a transaction at a node of the authorization network by inferring the trustworthiness of a customer to a transaction (the consumer) using data obtained from a different node of the authorization network. In this example, the authorization process is expedited by relying on the previous authentication decision of another node, where the previous decision may have been made based on a different payment device or different user inputs. Thus, in some embodiments, the invention is directed to using a decision made by a first node in the authorization network as a proxy for the authorization decision at a different node, thereby transferring the trustworthiness of a consumer (or an account associated with the consumer), consumer's device, payment device, or other aspect of the transaction from the first node to the second. This enables an authorization decision to be made at an earlier stage of the overall authorization process, or with less data processing or computational resources than might otherwise be required.

For example, expedited authorization for a transaction might eliminate the necessity to send a challenge or data inquiry to a consumer in a situation in which there has been a change in consumer or payment device data that would normally have prevented authorization of a transaction. Use of data collected or authorization decisions made at other nodes of the authorization network may also enable an account, device or user to be categorized as "seasoned" based on fewer contacts with a merchant, where "seasoning" refers to the concept of being accepted as a reliable and trustworthy party to a transaction.

In one embodiment, the present invention is directed to an apparatus for use in authorizing an electronic payment transaction for a consumer, where the apparatus includes a processor configured to execute a set of instructions, a memory coupled to the processor for storing the set of instructions, and the set of instructions stored in the memory, wherein when executed by the processor the instructions implement a method to receive a plurality of authorization messages, wherein each authorization message includes data regarding a consumer device used in an electronic payment transaction, process the authorization messages to determine if the consumer device should be considered seasoned, and if the consumer device should be considered seasoned, then provide confirmation of the device being reliable to a node of an authorization network as part of a subsequent transaction.

In another embodiment, the present invention is directed to a method of authorizing an electronic payment transaction for a consumer, where the method includes receiving transaction data at a payment processing node of an authorization network, determining whether the transaction was previously authorized by a trusted node of the authorization network, and if it is determined that the transaction was previously authorized by a trusted node of the authorization network, then authorizing the transaction at the payment processing node of the authorization network.

In another embodiment, the present invention is directed to a method of seasoning a consumer, consumer account, or consumer device that is part of an electronic payment transaction, where the method includes receiving transaction data at a payment processing node of an authorization network, processing the transaction data to determine whether the consumer, consumer account, or consumer device was considered seasoned by a trusted node of the authorization network, and if it is determined that the consumer, consumer account, or consumer device was considered seasoned by a trusted node of the authorization network, then identifying the consumer, consumer account, or consumer device as seasoned at the payment processing node.

In yet another embodiment, the present invention is directed to a method of authorizing an electronic payment transaction, where the method includes receiving a plurality of authorization messages, wherein each authorization message includes data regarding a consumer device used in an electronic payment transaction, processing the authorization messages to determine if the consumer device should be considered seasoned, and if the consumer device should be considered seasoned, then providing confirmation of the device being reliable to a node of an authorization network as part of a subsequent transaction.

Other objects and advantages of the present invention will be apparent to one of ordinary skill in the art upon review of the detailed description of the present invention and the included figures.

BRIEF DESCRIPTION OF THE DRAWINGS

FIGS. 4a and 4b are flowcharts illustrating a method for expediting the authorization of a transaction by a merchant by determining if a consumer, account, or device has previously been identified as seasoned by another merchant or should be considered seasoned based on the processing of multiple authorization messages, in accordance with some embodiments of the present invention.

DETAILED DESCRIPTION

Before proceeding to describe one or more embodiments of the present invention, and to assist with providing a better understanding of the invention, it may be useful to define some terms that will be used in describing the inventive system and method. In the context of the present invention:

A "consumer" is a customer to a transaction, or user of a payment device or device into which payment data may be entered and provided to a merchant as part of a transaction.

A "payment device" is a credit card, debit card, or other device or element from which payment data may be read or otherwise communicated.

A "consumer device" is a device into which a consumer enters payment or account data, with that data being communicated to a merchant as part of a transaction. Example consumer devices include, but are not limited to, home or business computers, mobile phones, PDAs, laptop computers, and the like.

"Seasoning" refers to a process of determining that transactions associated with a particular consumer, account, consumer device, etc. may be taken to be sufficiently trustworthy to authenticate future transactions associated with that consumer, account, or consumer device without the normal authentication process, or without issuing a challenge or other request for approval in a situation in which a challenge would normally be issued. Seasoning expedites the authentication process, and indicates a preferred or reliable status for the consumer, account or consumer device. In practice, a seasoned account might be approved for a transaction in a situation in which an issuing bank declined the transaction, or be eligible for discounts or other special treatment.

A "challenge" is a message or other form of communication in which additional information or an action is requested from a consumer as a pre-condition to authorizing a transaction. A payment processor may issue a challenge in situations in which a consumer has initiated a transaction using a new consumer device, payment method or account for a transaction, where the device, method, or account has not previously been "seasoned".

A "trusted node" is a node or element of the transaction authorization network that is relied upon to vouch for the trustworthiness of a consumer, consumer account, or consumer device.

Embodiments of the present invention are directed to a system, apparatus, and method for expediting all or part of the authorization process involved in an electronic payment transaction. Among other uses, the invention may be used to authorize a transaction in a situation in which it might not otherwise be approved, or to identify an account or consumer device as "seasoned" in a situation in which the account or device would normally require a larger number of transactions to be considered reliable.

Figure 1:
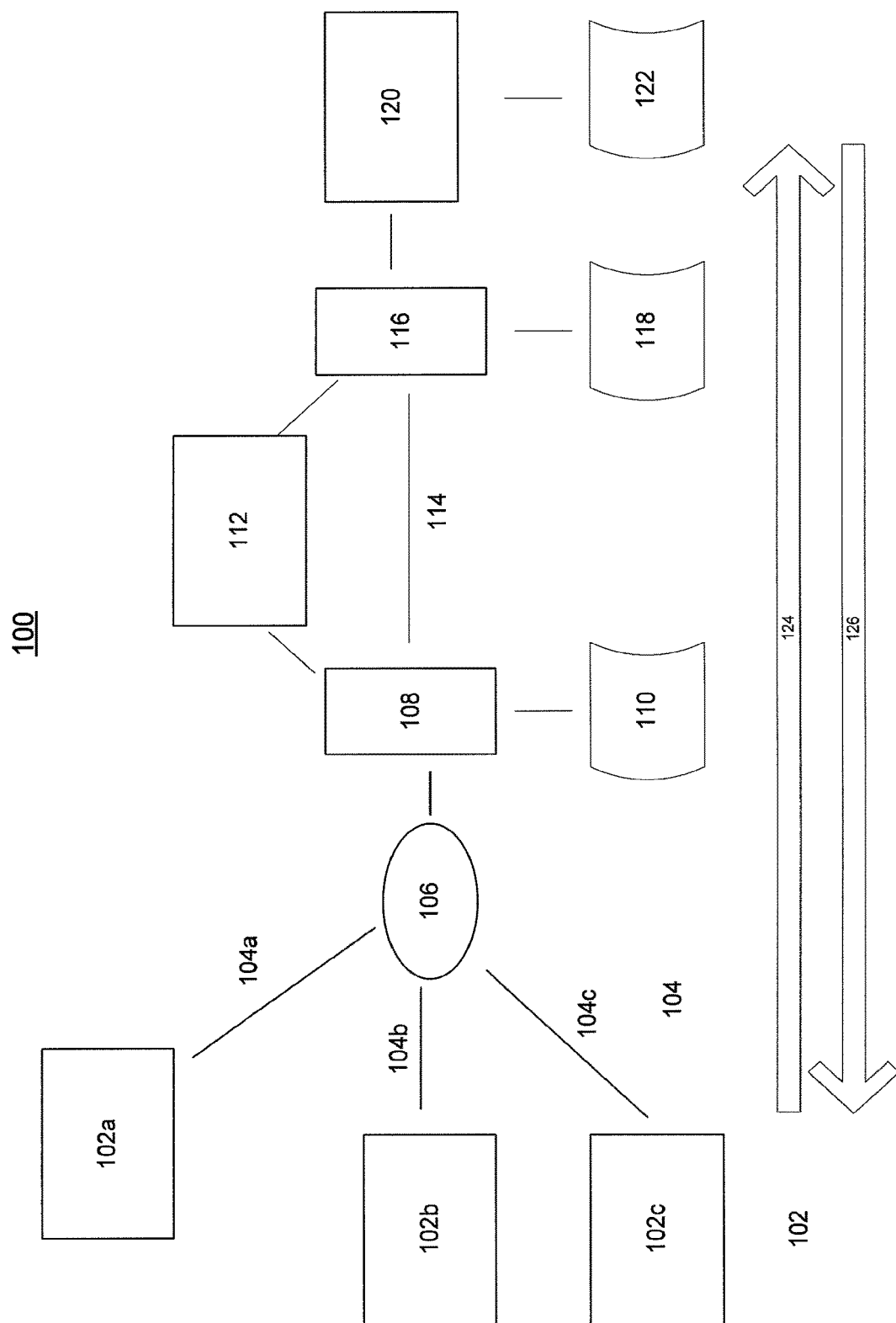
FIG. 1 is a functional block diagram illustrating the primary functional elements of an exemplary system for authorizing an electronic payment transaction.

Prior to describing one or more embodiments of the invention in greater detail, a brief discussion of the entities involved in authorizing an electronic payment transaction and their roles in the authorization process will be presented with regards to FIG. 1, which is a functional block diagram illustrating the primary functional elements of an exemplary system 100 for authorizing an electronic payment transaction. As shown in FIG. 1, in a typical transaction, a consumer wishing to purchase a good or service from a merchant provides payment transaction data that may be used as part of an authorization process by means of a device 102. The consumer may utilize a payment device such as a card having a magnetic strip encoded with account data or other relevant data (e.g., a standard credit or debit card) to initiate the transaction. In an E-commerce transaction, the consumer may enter data into a consumer device capable of communicating with a merchant or other element of system 100, such as a laptop or personal computer. The consumer may also initiate the transaction using data stored in and provided from a suitable form of data storage device (such as a smart card, mobile phone, PDA, or transportable memory device). As examples, a card or similar payment device may be presented to a point of sale terminal 102a which scans or reads data from that card. Similarly, a consumer may enter payment account data into a computing device 102b, as part of an E-commerce transaction. Further, a consumer may enter payment account data into a cell phone or other wireless device 102c and have that data communicated to the transaction authorization network by the device (or have previously entered and stored data that is accessed and provided to the network as part of the transaction).

The payment account data (as well as any required consumer data) is communicated over a communication network 106 to the merchant and ultimately to the merchant's transaction processing system 108. The data may be provided to communication network 106 by any method or elements suitable for use with device 102. For example, if device 102 is a point of sale terminal 102a, then the data may be provided by a wireline phone connection or suitable form of connection to the Internet 104a. If device 102 is a consumer's computing device 102b, then the data may be provided by a connection to the Internet 104b, such as a cable modem or wireless router. If device 102 is a cell phone or other wireless device 102c, then the data may be provided by a wireless network 104c to communication network 106. Depending on the merchant or transaction involved, communication network 106 may be the Internet, a closed network such as a corporate network, a wireless network, or other suitable form of data transport channel.

As part of the authorization process performed by the merchant, merchant transaction processing system 108 may access merchant database 110, which typically stores data regarding the customer/consumer (as the result of a registration process with the merchant, for example), the consumer's payment device, and the consumer's transaction history with the merchant. Merchant transaction processing system 108 typically communicates with Merchant Acquirer 112 (which manages the merchant's accounts) as part of the overall authorization process. Merchant transaction processing system 108 and/or Merchant Acquirer 112 provide data to Payment Processing Network 116, which among other functions, participates in the clearance and settlement processes which are part of the overall transaction processing. Communication and data transfer between Merchant transaction processing system 108 and Payment Processing Network 116 may be by means of a direct connection 114 or by means of an intermediary, such as Merchant Acquirer 112. As part of the transaction authorization process, Payment Processing Network 116 may access account database 118, which typically contains information regarding the consumer's account payment history, chargeback or dispute history, credit worthiness, etc. Payment Processing Network 116 communicates with Issuer 120 as part of the authorization process, where Issuer 120 is the entity that issued the payment device (or provided another form of data to enable a consumer to pay for goods or services) to the consumer and manages the consumer's account. Customer or consumer account data is typically stored in customer/consumer database 122 which is accessed by Issuer 120 as part of the authorization and account management processes.

In standard operation, an authorization request message is created during or after a consumer purchase of a good or service at a point of sale (POS). The point of sale may be a merchant's physical location or a virtual point of sale such as a web-site that is part of an E-commerce transaction. In a typical transaction, the authorization request message is sent from the point of sale to the merchant's Acquirer 112, to a Payment Processing Network 116, and then to an Issuer 120. An "authorization request message" can include a request for authorization to conduct an electronic payment transaction. It may include one or more of an account holder's payment account number, currency code, sale amount, merchant transaction stamp, acceptor city, acceptor state/country, etc. An authorization request message may be protected using a secure encryption method (e.g., 128-bit SSL or equivalent) in order to prevent data from being compromised. In a typical transaction authorization process, an authorization request message is communicated between nodes as indicated by arrow 124 in FIG. 1, while an authorization response (i.e., an approval or denial by an issuer or payment processing network) is communicated between nodes as indicated by arrow 126 in FIG. 1.

Payment Processing Network 116 may include data processing subsystems, networks, and other means of implementing operations used to support and deliver authorization services, exception file services, and clearing and settlement services for payment transactions. An exemplary Payment Processing Network may include VisaNet™. Payment Processing Networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

Payment Processing Network 116 may include a server computer. A server computer is typically a powerful computer or cluster of computers. For example, the server computer can be a large mainframe, a minicomputer cluster, or a group of servers functioning as a unit. In one example, the server computer may be a database server coupled to a web server. Payment Processing Network 116 may use any suitable wired or wireless network, including the Internet to permit communication and data transfer between network elements. Among other functions, Payment Processing Network 116 may be responsible for ensuring that a user is authorized to conduct the transaction (via an authentication process), confirm the identity of a party to a transaction (via receipt of a personal identification number), confirm a sufficient balance or credit line to permit a purchase, and reconcile the amount of purchase with the user's account (via entering a record of the transaction amount, date, etc.).

As depicted in FIG. 1, the authorization of a transaction typically involves decisions made at multiple nodes or elements of the overall authorization or transaction processing network. These nodes include, but are not limited to, the merchant, the merchant's Acquirer, the payment processor, and the Issuer. Each node may have access to its own data regarding the consumer, the payment device, the consumer's transaction history with a merchant or set of merchants, the consumer's payment history, and fraudulent activities concerning the consumer's account or device, with this data typically not exchanged between nodes. Further, each node will typically have its own rules or guidelines for deciding if a particular transaction should be authorized, based on the transaction data and the node's own data and decision making rules.

As an example, a merchant may consider the following data and criteria when deciding whether to approve or deny a transaction with a customer/consumer:
  Verification of card or payment device data, such as account format, expiration date, service code, security code, etc.
  Registration or previous relationship of the customer with the merchant, such as:
    Previous approved transactions with this customer or their account;
    Customer is in merchant database and does not hold a significant record of chargeback's or other forms of non-payment on charged amounts;
    Customer has purchased from same physical address in the past, and/or had merchandise shipped to the same physical address in the past; or
    Customer has purchased from same origination device in the past (e.g., same internet IP, cell phone ID number, etc.).

Similarly, an Acquirer may consider the following data and criteria when deciding whether to approve or deny a transaction with a customer/consumer:
  Is the account on a list of lost/stolen payment devices?
  Is the account in a recognized account number range or from a recognized issuer?
  Is the merchant who is part of the transaction recognized by the acquirer and in good standing?

The payment processing network may consider the following data and criteria when deciding whether to approve or deny a transaction with a customer/consumer:
  Is the account on a list of lost/stolen payment devices?
  Does the proposed transaction meet acceptable guidelines for amount, location, type of product, history of purchases on this account?
  Does the transaction pass a validation test for cryptogram and other verification checks, such as zip code?

In addition, the Issuer may consider the following data and criteria when deciding whether to approve or deny a transaction with a customer/consumer:
  Is the account on a list of lost/stolen payment devices?
  Does the proposed transaction meet acceptable guidelines for amount, location, type of product, history of purchases made by this customer?
  Does the transaction pass a validation test for cryptogram and other verification checks such as name, address, or zip code?
  Does the history of this cardholder for making timely payments support authorization of this transaction?
  Are there sufficient funds available in the account, including debit and prepaid account fund levels for this transaction?

As suggested by the description of the data used by each node to make a decision whether to authorize or deny a transaction, each node may have different information about an account or customer, as well as different criteria or considerations when making an authorization decision. However, because this data is generally not shared amongst the nodes, each node must make its own independent authorization decision in the absence of information from other nodes that could be used to expedite the decision process or increase confidence in the decision. Typically, disapproval of a transaction by a node in the authorization network is an attempt to minimize exposure to transactions that may be fraudulent or otherwise not reimbursable. In making an authorization decision, each node may weigh the risk of the transaction against that of denying the sale to a good (i.e., honest or reliable) account or consumer.

In addition to authorization decisions made for a specific transaction based on the data for that transaction, a node in the authorization network may decline to authorize a transaction because of the consumer device or account that initiated the transaction. For example, a node in the authorization network may decline to authorize a transaction made by a consumer's computer or cell phone if that device or the account being used for the transaction had not been previously involved with a sufficient number of valid transactions, i.e., had not been properly "seasoned". In a situation in which a consumer device or account being used to initiate a transaction is not properly seasoned, a node of the authorization network may send a challenge to the consumer, requiring them to provide additional information prior to the node making an authorization decision. A challenge consumes valuable computational and network resources and may inconvenience users, thereby causing a delay in the authorization of a transaction and causing the consumer to be less likely to initiate transactions in the future. In addition, this situation may prevent a merchant from accepting a transaction from a customer that has been qualified as reliable and trustworthy by others, or one initiated by a device that is associated with a previously "seasoned" account.

In order to overcome these disadvantages of the present authorization system, and to expedite authorization of a specific transaction or the seasoning of a consumer, account or consumer device, in some embodiments, the present invention introduces the concept of a "trusted node" as part of the authorization process. Here a trusted node represents a node or element of the transaction authorization network that is relied upon to vouch for the trustworthiness of a consumer, account, or consumer device. In such circumstances the prior authorization of a transaction by a node in the authorization network is accepted as sufficient to justify a different node's authorization of that transaction. Similarly, a trusted node's acceptance of a consumer, account, or consumer device as being of sufficient trustworthiness to qualify as being "seasoned" may be accepted by a different node as reason to classify that consumer, account, or consumer device as seasoned or otherwise expedite the authorization process for a current transaction and for subsequent transactions.

In some embodiments, a trusted node, might include, but not be limited to, the following:
  A physical merchant or web-site having established and reliable, or sufficiently rigorous authorization/authentication procedures (e.g., Amazon, eBay, Paypal, a governmental entity, etc.);
  A web-site or other product or service provider having a continuing relationship with a consumer, thereby reducing the risk in conducting transactions with that consumer (a virus software that supplies regular updates, etc.); or
  A service provider or other entity having an on-going relationship with a consumer in which recurring payments are made (e.g., utility payments, tax payments, etc.), with the assumption that a sufficient authentication process has been used to verify the reliability of the consumer.

Further, in some embodiments, the present invention includes a process for gathering information about a consumer, consumer account, or consumer device as part of an authorization message and processing that data (if needed, along with other consumer or account data) to identify consumers, accounts, or devices that may be considered sufficiently reliable to be considered seasoned for purposes of transaction authorization decisions being made by nodes of the authorization network. For example, by analyzing transaction and related data collected from multiple merchants, a payment processing system that is part of an authorization network may determine that a consumer, account, or consumer device is sufficiently reliable and trustworthy to qualify as "seasoned", or is considered seasoned by one or more nodes of the network. This information may be provided to merchants that are part of later transactions involving the same customer, account, or customer device to assist those merchants in making authorization decisions in situations where the merchant has insufficient experience with the customer, account, or customer device to qualify that entity as seasoned.

In general, embodiments of the invention include, but are not limited to, being implemented as part of the following actions or transaction data processing stages, with each such action or transaction data processing stage capable of being implemented as an apparatus that includes a processor executing a set of instructions, a method, or a system, among other embodiments:
  Authorization of a transaction based on communication of data through, or approval of the transaction by a trusted node;
  Seasoning of a consumer, account, or consumer device based on prior seasoning of the same by a trusted node;
  Collection and processing of consumer device or account data as part of transactions involving different merchants to enable the device or account to be associated with a reliable consumer or consumers and expedite the seasoning or authorization process;
  Providing collected and processed consumer, consumer account, or consumer device data (or confirmation of consumer, account, or device seasoning) provided by a first merchant or group of merchants to a second merchant to assist the second merchant in deciding whether to authorize a transaction or identify an account or device as seasoned; and
  Detection of previous consumer, account, or device seasoning by a merchant or merchants based on data contained in, or omitted from, an authorization message.

Figure 2:
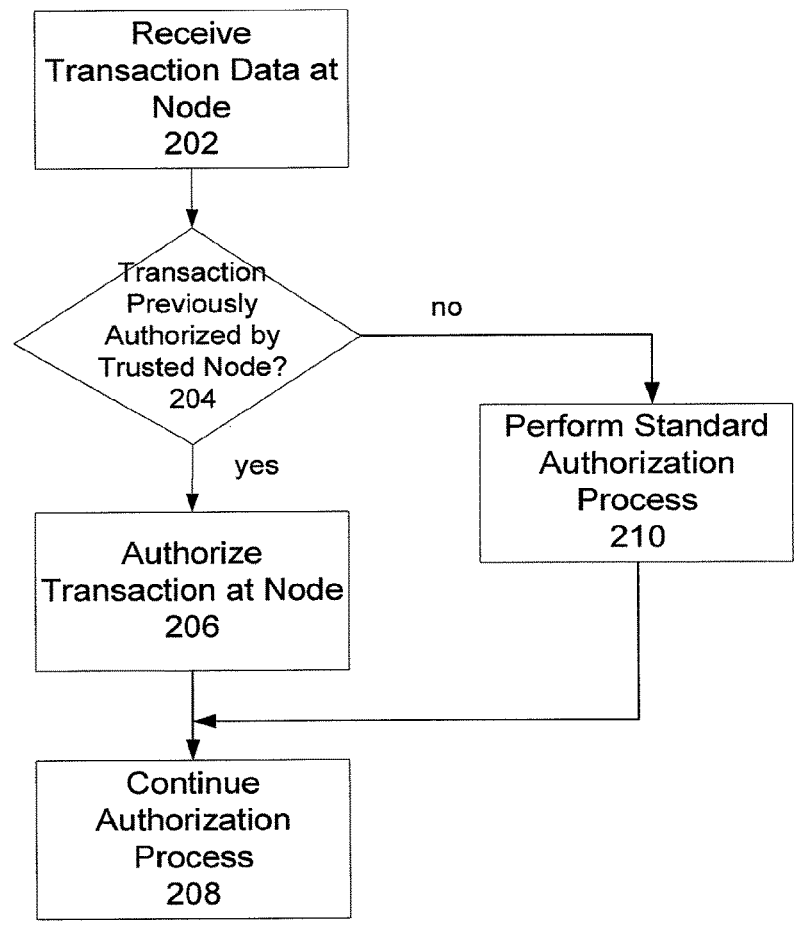
FIG. 2 is a flowchart illustrating a method for expediting the authorization of a transaction by using a trusted node, in accordance with some embodiments of the present invention.

These and other embodiments of the invention will now be described in greater detail with reference to FIGS. 2-5. FIG. 2 is a flowchart illustrating a method 200 for expediting the authorization of a transaction by using a trusted node, in accordance with some embodiments of the present invention.

FIG. 2 illustrates a group or set of steps or stages that represent a typical transaction authorization process. It is noted that the steps or stages shown in the figure may represent the entire authorization process or only a portion of the overall process. Further, although the process described with reference to FIG. 2 will typically be performed by a payment processing network node or processor executing a set of instructions, it may also be performed by other nodes of the authorization network. As shown in stage 202 of FIG. 2, transaction data is received at a node of the authorization network. The node typically initiates its own authorization process based on the transaction data and other data available to that node. However, in accordance with some embodiments of the present invention, the node determines if the transaction had previously been authorized by a "trusted node" of the authorization network. Prior authorization by a trusted node may be determined by any suitable means, including, but not limited to, determining if the data was communicated to the present node after being processed by a trusted node, determining whether the transaction was authorized by a trusted node based on the setting of a flag or other indicator in the data sent to the current node, etc. If the transaction was previously authorized by a trusted node, then the transaction is considered to be authorized by the present node (stage 206) and the overall authorization process is continued (stage 208). This may involve passing an authorization message or other data to another node, such as the merchant who initiated the transaction approval process. If the transaction was not previously authorized by a trusted node, then the standard authorization process for the present node is performed (stage 210), after which the overall authorization process is continued (stage 208). Note that in addition to, or instead of, making an authorization decision at the present node, the present node may pass information regarding the trusted node's authorization decision to another node in the authorization network to assist that node in making an authorization decision.

Figure 3:
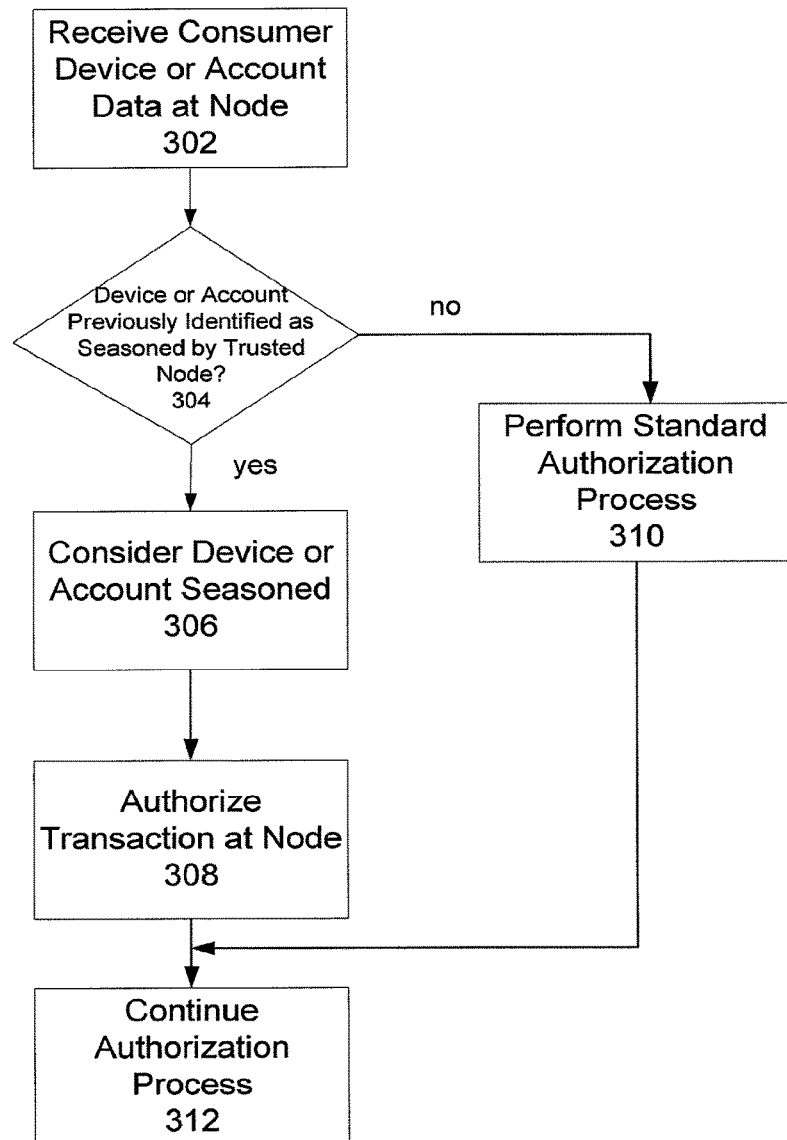
FIG. 3 is a flowchart illustrating a method for expediting the seasoning of a consumer device or account by using a trusted node, in accordance with some embodiments of the present invention.

FIG. 3 is a flowchart illustrating a method 300 for expediting the seasoning of a consumer device or account by using a trusted node, in accordance with some embodiments of the present invention. FIG. 3 illustrates a group or set of steps or stages that may occur during a transaction authorization process. Although the process described with reference to FIG. 3 will typically be performed by a payment processing network node, it may also be performed by other nodes of the authorization network. As shown in stage 302 of FIG. 3, data concerning a consumer device or account is received at a node of the authorization network. Typically, the data will be received as part of a transaction authorization message. The data may include device identification data (such as an IP address, cell phone identifier, device security code, etc.) or account related data (such as an account security code, consumer data, etc.). In accordance with some embodiments of the present invention, the node determines if the device or account had previously been identified as seasoned (i.e., reliable and trustworthy) by a "trusted node" of the authorization network (stage 304). Prior identification as seasoned by a trusted node may be determined by any suitable means, including, but not limited to, determining if the transaction, consumer, or account data provided to the present node includes or fails to include specific data (such as a card verification code, etc.).

If the consumer device or account was identified as seasoned by a trusted node, then the device or account is considered to be seasoned by the present node (stage 306) and the transaction is authorized (stage 308). Being considered seasoned may involve setting a flag or otherwise recording that the device or account is considered to be sufficiently reliable for expedited authorization when involved in future transactions. The overall authorization process then continues (stage 312), where this may involve additional authorization steps or passing an authorization message or other data to another node, such as the merchant who initiated the transaction approval process. If the device or consumer was not previously seasoned by a trusted node, then the standard authorization process for the present node is performed (stage 310), after which the overall authorization process is continued (stage 312). Note that the present node may pass information regarding the trusted node's seasoning determination to another node in the authorization network to assist that node in making an authorization decision.

The embodiments of the present invention described with reference to FIGS. 2 and 3 have been directed to the use of a trusted node to expedite the authorization of a transaction. This is based on the trusted node previously authorizing the transaction or because the consumer, account, or consumer device has been identified as seasoned and hence reliable by the trusted node based on prior experience with the consumer, etc.

Another embodiment of the present invention relates to the use of a node of the authorization network to process authorization messages from multiple transactions to obtain an overview of the reliability of a consumer, account, or consumer device. This overview may provide an indication of the reliability or unreliability of a consumer, etc. that would not be apparent from the transactions involving a single merchant or consumer device. The multiple authorization messages may be processed to provide a measure, score, or other indicia of trustworthiness, with this information being provided to another node of the authorization network to assist that node in making an authorization decision for a specific transaction.

FIGS. 4a and 4b are flowcharts illustrating a method 400 for expediting the authorization of a transaction by a merchant by determining if a consumer, account, or device has previously been identified as seasoned by another merchant or should be considered seasoned based on the processing of multiple authorization messages, in accordance with some embodiments of the present invention. In a typical embodiment, the inventive method 400 may include the steps or stages of one or both of FIGS. 4a and 4b, with the steps of FIG. 4a typically being performed by a Merchant and the steps of FIG. 4b typically being performed by a Payment Processing Network. Note that the process depicted in FIG. 4a may be executed multiple times by different merchants, thereby generating multiple authorization messages that are provided to the payment processing network for analysis and subsequent use as the basis for providing seasoning or other transaction authorization data to a merchant as part of a subsequent transaction.

As depicted in FIG. 4a, the inventive process or method includes a merchant constructing an authorization message that includes customer, account, or customer device specific data that is not normally included with the payment data (account number, transaction amount, etc) that is part of a typical authorization message (stage 402). The added data might include customer personal information such as zip code or age, and/or device data such as IP address, computer ID number, or cell phone number. This is data which is not generally used or sent to the Payment Processing Network as part of the transaction authorization process.

The authorization message is communicated, either directly or indirectly, to the payment processing network (stage 404). However, because the authorization message contains additional information regarding a customer or customer device, the payment processing network can process authorization messages from one or more merchants to develop a profile of the reliability of the customer or device. As shown in FIG. 4b, a payment processing network may receive authorization messages containing the additional data from one or more merchants (stage 406). The payment processing network then processes the one or more messages to determine that a consumer, account, or consumer device is considered seasoned and hence reliable by one or more merchants (stage 408). Similarly, the payment processing network can process one or more messages to collect data and apply its own criteria to enable the payment processor to identify a consumer, account, or consumer device as sufficiently reliable, and hence that should be considered as seasoned for the authorization of subsequent transactions (stage 408). For example, the payment processing network may determine that the same account is associated with more than one consumer device (e.g., different computing devices or a computing device and a cell phone) and that since the account holder is reliable, transactions initiated using those devices should be eligible for expedited authorization.

Once a consumer, account, or consumer device has been identified as being considered seasoned by a merchant, or as one that should be considered reliable or seasoned based on evaluation by the payment processing network, this information can be provided to a merchant as part of the authorization process for a subsequent transaction (stage 410). This information may also be used by the payment processing node itself as part of its own authorization process. Thus, the authorization process for a subsequent transaction can be expedited by communicating information regarding the trustworthiness of a consumer, account, or consumer device to a merchant or other node of the authorization network. As a result, the information regarding the trustworthiness or prior acceptance as being seasoned can be used by other nodes of the authorization network to expedite subsequent transactions. This is because once other nodes are informed of the acceptance of a consumer, account, or consumer device as being seasoned or as being a sufficiently reliable party to transactions, the other nodes may also accept the consumer, account, or consumer device as being seasoned. Note that the "seasoning" or reliability information from the Payment Processing Network that is provided to a merchant might be in the form of a score (good/bad, a numerical rating, rating in terms of values for multiple parameters, etc.) or other suitable measure. The merchant or other node of the authorization network may use this "seasoning" score along with other transaction or authorization data (e.g., a decision of approval/decline from the issuer) to decide whether to allow the transaction to take place.

As described, in some embodiments, the present invention may be used to expedite the authorization of a transaction or the identification of a consumer, account or consumer device as being sufficiently reliable to be considered seasoned by a merchant or other node of the authorization network. In some embodiments, the determination that a consumer, account or consumer device is considered seasoned by a node of the authorization network can be based on whether certain data is either present or absent from an authorization message.

For example, if certain data that would typically be present as part of an authorization message is absent, then a payment processor might conclude that the source of the message had already identified the consumer, account, or consumer device as being sufficiently reliable to be considered seasoned. Similarly, if certain data is included in the message (such as an indicator of acceptance of the consumer, account, or consumer device as eligible for preferential treatment), then a payment processor might conclude that the source of the message (e.g., a merchant) had already identified the consumer, account, or consumer device as being sufficiently reliable to be considered seasoned. In either case, once the payment processing network determines that a consumer, account, or consumer device is accepted as seasoned by a merchant, then this information can be stored and used to expedite authorization of transactions originating with other merchants.

For example, in each of the embodiments of the present invention described, the determination that a consumer, account, or consumer device should be accepted as seasoned may be recorded in a data store of the payment processing node or payment processor and used as the basis for authorization decisions made by the payment processor for future transactions initiated by the consumer, account, or device. Further, as noted, the determination of a consumer, account, or consumer device as being seasoned can be communicated to merchants involved in subsequent transactions to assist them in making transaction authorization decisions.

The following description of use cases or possible scenarios in which the present invention might be used are intended as exemplary and not exhaustive, as other implementations and embodiments will be apparent to those of skill in the art.

As a first use case or scenario, an E-commerce merchant has a web-site that includes a customer registration system that is used to collect personal information from first time customers. After the merchant collects the information, the customer is assigned an ID number and PIN, which the customer uses in subsequent purchases so they do not to have to re-enter the personal information each time they buy from this merchant. The information collected by the merchant might include the customer billing and shipping address/zip code, home phone number, customer age or birth date, and credit card account number (plus, if desired, other merchant or product specific preferences). The merchant also collects the Internet IP address and computer ID number, or cell phone ID number used by the customer in their communications with the merchant. The merchant stores the customer information in their customer database. Although possibly requested from the customer to verify the credit card account, the merchant would not store the card verification code as that information may not be stored by the merchant based on the rules of the payment industry.

The first time the customer makes a purchase from the merchant, the merchant sends authorization data to the payment processing network, where the authorization data includes the card verification code. For purposes of this example, the transaction is authorized by the payment processing network and the issuing bank. The merchant allows or denies the transaction based on the authorization from the issuing bank.

The merchant stores the data for this customer in their database. The payment processing network also recognizes that the entire authorization data record was sent for authorization by the merchant. No expected data was absent, specifically data that cannot be stored such as the card verification code. The merchant is able to settle this transaction and is paid as expected. Three months pass by and there is no chargeback for this transaction. The merchant recognizes that this customer is legitimate, pays their bills, and does not charge back for merchandise shipped to the registered address. Based on this, the merchant identifies the customer as reliable (i.e., seasoned) and places this customer into a preferred status within the merchant customer database. This indicates to the merchant that the next transaction involving this registered customer and using the same registration information should be accepted as a valid and acceptable transaction.

A period of time passes and the same customer returns to the merchant's website and registers with their user ID and PIN. The customer purchases merchandise using the same data that was previously used as part of the registration process, including credit card and shipping address. The merchant recognizes the "seasoned" or preferred status of the customer and does not ask for the card verification code. The new transaction is authorized by the issuer without the presence of the card verification code data in the authorization message to the payment processing network.

The payment processing network recognizes that the new transaction was authorized without the card verification code being included in the authorization process. The payment processing network infers that this customer has already been identified as reliable or "seasoned" by this merchant. The payment processing network stores this information in their account database for this account number. The payment processing network also stores the other customer, account, or customer device information provided in the transaction messages. The payment processing network then identifies the customer as reliable or "seasoned" in their account database.

A different merchant now requests authorization from the payment processing network for a transaction involving the same customer. This merchant has not dealt with the customer before, and the customer does not register with this merchant. For example, this may be a one-time transaction with this merchant by the customer. The transaction authorization message includes data that matches the data corresponding to the customer identified as seasoned in the payment processing network account database. Based on this, the payment processing network scores this as a 'good' or "seasoned" account, and the merchant uses this information to decide whether to allow or deny the transaction from a non-registered customer. Thus, in this example the new merchant gains the benefit of a "seasoning" decision performed in the past by a different merchant.

In another scenario, the same customer returns to the first merchant's web-site and registers by providing their previously established user ID and PIN. However for this transaction, the customer changes the billing and shipping address after they register (e.g., because they have moved since the earlier transaction). The transaction is processed through the authorization network to the payment processing network as usual, including the billing and shipping address data. The payment processing network recognizes that the address has changed, and notes this fact. The transaction is approved by the issuer, and the merchant accepts and settles this transaction. The payment processing network recognizes the fact that the merchant had accepted this transaction from the new address of this customer. The data processing network either replaces the address for this customer or requests an address update from the merchant or the issuer. This becomes an early warning that customer data has changed for a given account.

Figure 5:
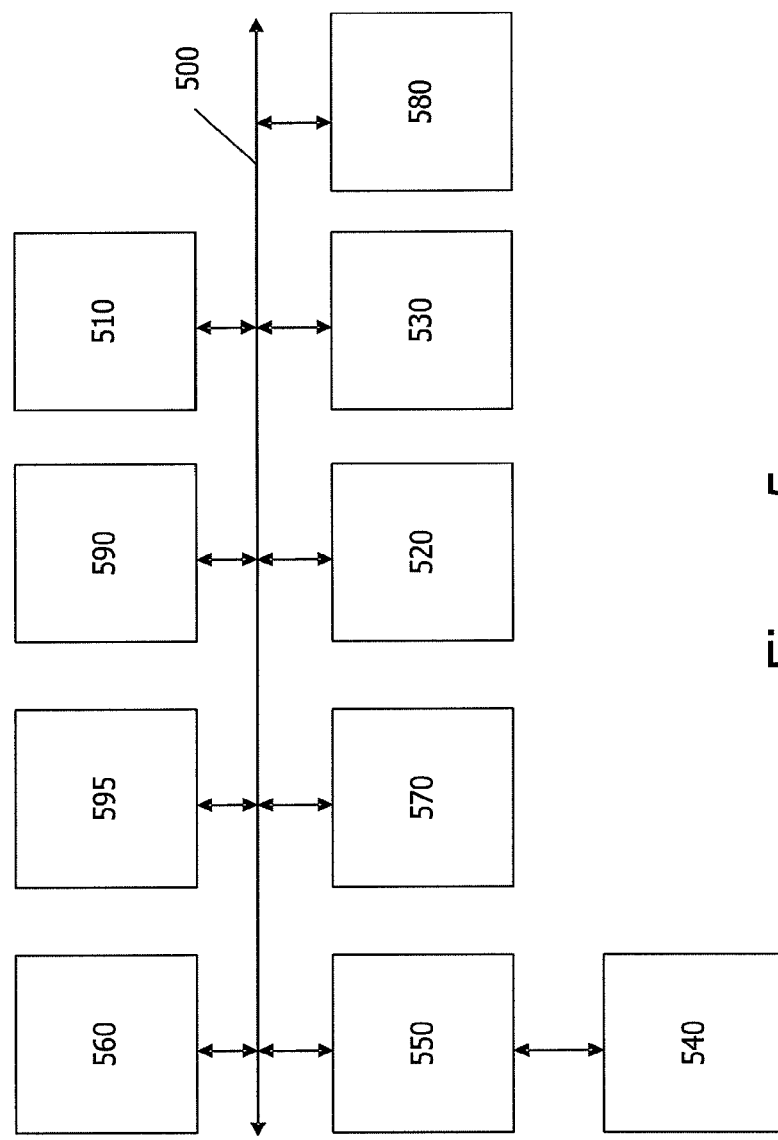
FIG. 5 is a block diagram of elements that may be present in a computer device or system configured to execute a method or process for expediting the authorization of a payment transaction in accordance with some embodiments of the invention.

In some embodiments, the inventive methods, processes or operations for expediting the authorization of a payment transaction may be wholly or partially implemented in the form of a set of instructions executed by a central processing unit (CPU) or microprocessor. The CPU or microprocessor may be incorporated in an apparatus, server or other computing device operated by, or in communication with, a node of the authorization network. As an example, FIG. 5 is a block diagram of elements that may be present in a computer device or system configured to execute a method or process for expediting the authorization of a payment transaction in accordance with some embodiments of the invention. The subsystems shown in FIG. 5 are interconnected via a system bus 500. Additional subsystems such as a printer 510, a keyboard 520, a fixed disk 530, a monitor 540, which is coupled to a display adapter 550, and others are shown. Peripherals and input/output (I/O) devices, which couple to an I/O controller 560, can be connected to the computer system by any number of means known in the art, such as a serial port 570. For example, the serial port 570 or an external interface 580 can be used to connect the computer apparatus to a wide area network such as the Internet, a mouse input device, or a scanner. The interconnection via the system bus 500 allows a central processor 590 to communicate with each subsystem and to control the execution of instructions that may be stored in a system memory 595 or the fixed disk 530, as well as the exchange of information between subsystems. The system memory 595 and/or the fixed disk 530 may embody a computer readable medium.

In accordance with embodiments of the present invention, there have been described a system, apparatus, and methods for expediting the authorization of a payment transaction. In some embodiments, this is accomplished by inferring the trustworthiness of a consumer, account, or consumer device used in the transaction because that consumer, account, or consumer device was determined to be trustworthy by another node of the authorization network. In other embodiments, this is accomplished by collecting information about a consumer device as part of transactions initiated with multiple merchants and then processing that information to identify the device as trustworthy for a transaction involving a different merchant.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a," "an" or "the" is intended to mean "at least one," unless specifically indicated to the contrary.

What is claimed is:

1. A method comprising:
  receiving an authorization request message at a computer in a network from a terminal of a node in the network, wherein the authorization request message includes a request for authorizing an interaction between the terminal and a user;
  identifying, by the computer, a trusted node indicator in the authorization request message;
  determining, by the computer based on the trusted node indicator in the authorization request message, that the node that transmitted the authorization request message is a trusted node;
  by-passing performing a user authentication by the computer based, at least in part, on the trusted node indicator, wherein the computer relies upon user authentication assertion of the trusted node;
  updating, by the computer, a record associated with the user at a database to indicate that the user is an authenticated user based on the user authentication performed by the node;
  approving the authorization request message at the computer without requiring, from the user, authentication data from the user; and
  sending, from the computer to the node, an authorization response message indicating that the request is authorized.

2. The method of claim 1, wherein the computer provides authorization, and clearing and settlement services.

3. The method of claim 1, further comprising:
before receiving the authorization request message, receiving an indication from the node that a prior user associated with a prior authorization request is seasoned; and
storing prior user information associated with the prior user in the database, wherein authorizing the request at the computer uses the prior user information.

4. The method of claim 3, wherein the request is authorized if the user is same as the prior user.

5. The method of claim 4, wherein the prior user information comprises a prior shipping address, wherein user information associated with the user comprises a first shipping address, wherein the request is authorized if the first shipping address is same as the prior shipping address.

6. The method of claim 3, wherein the indication from the node is included in a prior authorization request message received by the computer.

7. The method of claim 1, wherein the user was previously authenticated by the node using a user ID and a PIN associated with the user, and wherein the node authenticates the user upon recognizing the user ID and the PIN.

8. A method comprising:
receiving, at a computer in a network, an authorization request message from a terminal, wherein the authorization request message includes a request for authorizing an interaction between the terminal and a user;
identifying, by the computer, a seasoned user indicator in the authorization request message, the seasoned user indicator indicating that the user is deemed trustworthy by an entity in the network;
by-passing performing a user authentication by the computer based, at least in part, on the seasoned user indicator;
approving the authorization request message at the computer without requiring, from the user, authentication data from the user; and
sending, from the computer to the terminal, an authorization response message indicating that the request is authorized.

9. The method of claim 8, further comprising:
prior to receiving the authorization request message at the computer:
analyzing, by the computer, historical data associated with the user;
determining, by the computer, that the user is trustworthy to be considered a seasoned user based on the historical data; and
transmitting, by the computer to the terminal, the seasoned user indicator associated with the user.

10. The method of claim 9, further comprising, prior to analyzing:
collecting, by the computer, the historical data associated with the user from a plurality of terminals.

11. The method of claim 9, wherein determining that the user is trustworthy to be considered a seasoned user further comprises:
processing, by the computer, authorization messages associated with past requests to determine a measure of trustworthiness of the user; and
if the measure of trustworthiness exceeds a predetermined threshold, then identifying, by the computer, the user as the seasoned user.

12. The method of claim 8, further comprising:
prior to receiving the authorization request message at the computer:
determining, by the computer, that the user is trustworthy to be considered a seasoned user based on a trusted node in the network indicating a seasoned status for the user, wherein the trusted node is relied upon to vouch for trustworthiness of the user; and
transmitting, by the computer to the terminal, the seasoned user indicator associated with the user.

13. The method of claim 8, wherein the computer performs clearing and settlement services.

14. The method of claim 8, further comprising:
notifying, by the computer, another node in the network that the user is associated with the seasoned user indicator indicating that the user is deemed trustworthy.

15. A server computer comprising:
a processor; and
a memory storing instructions that, when executed by the processor, cause the processor to:
receive an authorization request message at a computer in a network from a terminal of a node in the network, wherein the authorization request message includes a request for authorizing an interaction between the terminal and a user;
identify a trusted node indicator in the authorization request message;
determining, on the trusted node indicator in the authorization request message, that the node that transmitted the authorization request message is a trusted node;
by-passing performing a user authentication based, at least in part, on the trusted node indicator, wherein the computer relies upon user authentication assertion of the trusted node;
update a record associated with the user at a database to indicate that the user is an authenticated user based on the user authentication performed by the node;
approve the authorization request message at the computer without requiring, from the user, authentication data from the user; and
send, to the node, an authorization response message indicating that the request is authorized.

16. The server computer of claim 15, wherein the server computer is programmed to provide clearing and settlement services.

17. The server computer of claim 15, wherein the instructions, when executed by the processor, further cause the processor to:
before receiving the authorization request message, receive an indication from the node that a prior user associated with a prior authorization request is seasoned; and
store prior user information associated with the prior user in the database, wherein the request is authorized using the prior user information.

18. The server computer of claim 17, wherein the instructions, when executed by the processor, further cause the processor to:
authorize the request if the user is same as the prior user.

19. The server computer of claim 17, wherein the instructions, when executed by the processor, further cause the processor to:
authorize the request when a first shipping address associated with the user is same as a prior shipping address included in the prior user information.

20. The server computer of claim 15, wherein the user was previously authenticated by the node using a user ID and a PIN associated with the user, and wherein the node authenticates the user upon recognizing the user ID and the PIN.

* * * * *